United States Patent
Doiron et al.

(10) Patent No.: US 12,395,348 B2
(45) Date of Patent: Aug. 19, 2025

(54) CRYPTOGRAPHICALLY LINKED IDENTITIES

(71) Applicant: nChain Licensing AG, Zug (CH)

(72) Inventors: Brock Doiron, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 587 days.

(21) Appl. No.: 17/760,730

(22) PCT Filed: Aug. 18, 2020

(86) PCT No.: PCT/IB2020/057766
§ 371 (c)(1),
(2) Date: Mar. 15, 2022

(87) PCT Pub. No.: WO2021/053427
PCT Pub. Date: Mar. 25, 2021

(65) Prior Publication Data
US 2022/0337427 A1    Oct. 20, 2022

(30) Foreign Application Priority Data
Sep. 16, 2019    (GB) ...................................... 1913318

(51) Int. Cl.
*H04L 9/32* (2006.01)
*H04L 9/00* (2022.01)
*H04L 9/08* (2006.01)

(52) U.S. Cl.
CPC .......... *H04L 9/3247* (2013.01); *H04L 9/0838* (2013.01); *H04L 9/3242* (2013.01); *H04L 9/50* (2022.05)

(58) Field of Classification Search
CPC ... H04L 9/3247; H04L 9/0838; H04L 9/3242; H04L 9/50; H04L 9/3239; H04L 9/0861
See application file for complete search history.

(56) References Cited

U.S. PATENT DOCUMENTS 10,366,388 B2 *   7/2019   Campero ........... G06Q 20/3676
11,218,324 B2 *   1/2022   Wentz ..................... H04L 9/088
(Continued)

FOREIGN PATENT DOCUMENTS

JP    2019515534 A    6/2019
JP    2022511678 A    2/2022
(Continued)

OTHER PUBLICATIONS

Zhang, Chao. "Truxen: A trusted computing enhanced blockchain." arXiv preprint arXiv:1904.08335 (2019). (Year: 2019).*
(Continued)

*Primary Examiner* — Michael R Vaughan
(74) *Attorney, Agent, or Firm* — Messner Reeves LLP

(57) ABSTRACT

A computer-implemented method of linking a first party and a second party, the method being performed by the first party and comprising: obtaining a first cryptographic public-private key pair comprising a first private key and a corresponding first public key; generating a first shared private key pair known to the first party and the second party; and generating a second cryptographic public-private key pair comprising a second private key and a corresponding second public key, wherein the second private key is generated based on the first private key and the shared private key.

20 Claims, 5 Drawing Sheets

(56) References Cited

U.S. PATENT DOCUMENTS

| | | | |
|---|---|---|---|
| 2017/0317833 A1* | 11/2017 | Smith | H04L 9/3066 |
| 2018/0145836 A1 | 5/2018 | Saur et al. | |
| 2019/0052454 A1 | 2/2019 | Wright et al. | |
| 2019/0065733 A1 | 2/2019 | Forehand | |
| 2019/0102782 A1 | 4/2019 | Diehl | |
| 2020/0219099 A1* | 7/2020 | Mohassel | H04L 9/3218 |

FOREIGN PATENT DOCUMENTS

| | | | |
|---|---|---|---|
| WO | 2017145016 | 8/2017 | |
| WO | 2019058240 A1 | 3/2019 | |
| WO | WO-2019072823 A1 * | 4/2019 | G06F 21/6209 |
| WO | 2019116250 | 6/2019 | |
| WO | 2019120318 | 6/2019 | |
| WO | 2019220270 | 11/2019 | |
| WO | 2019220271 | 11/2019 | |
| WO | 2019220317 | 11/2019 | |
| WO | 2019220318 | 11/2019 | |
| WO | 2020079534 | 4/2020 | |
| WO | 2020212796 | 10/2020 | |

OTHER PUBLICATIONS

T. Dierks et al., The Transport Layer Security (TLS) Protocol, Version 1.2, Network Working Group, Aug. 2008, pp. 1-104, The IETF Trust.

KPMG et al., Institutionalization of cryptoassets, Nov. 2018, pp. 1-42, KPMG LLP, https://assets.kpmg/content/dam/kpmg/us/pdf/2018/11/institutionalization-cryptoassets.pdf [Retrieved Jun. 14, 2019].

Wikipedia Contributors, Elliptic Curve Digital Signature Algorithm, Sep. 2019, pp. 1-6, Wikipedia, The Free Encyclopedia., https://en.wikipedia.org/wiki/Elliptic_Curve_Digital_Signature_Algorithm.

Bitcoinwiki Contributors, Pay-to-Pubkey Hash, Sep. 16, 2019, pp. 1-4, BitcoinWiki, https://en.bitcoinwiki.org/wiki/Pay-to-Pubkey_Hash.

GB1913318.0 Combined Search and Examination Report dated Jun. 10, 2020.

PCT/IB2020/057766 International Search Report and Written Opinion dated Jan. 18, 2021.

* cited by examiner

CRYPTOGRAPHICALLY LINKED IDENTITIES

CROSS REFERENCE TO RELATED APPLICATIONS

This application is the U.S. National Stage of International Application No. PCT/IB2020/057766 filed on Aug. 18, 2020, which claims the benefit of United Kingdom Patent Application No. 1913318.0, filed on Sep. 16, 2019, the contents of which are incorporated herein by reference in their entireties.

TECHNICAL FIELD

The present disclosure relates to methods for linking first and second parties using cryptographic public-private key pairs and for verifying that link. In particular, the methods enable a first party to prove that their public-private key pair is cryptographically linked with the second party's public-private key pair.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

Identity management and verification is critical in many business-to-business and business-to-consumer communications in order to avoid problems such as money laundering, identity theft, and corruption. However, it is not always possible to directly confirm the identity of a party (e.g. an individual or a business). Instead, trust in a party can be ascertained through verified information and endorsements from a trusted third party. That way, even anonymous peers can establish enough trust to communicate sensitive information. One such example of this is transport layer security (TLS) certificates which provide security over the internet.

SUMMARY

Blockchains provide a form of identification via public keys and addresses. These public keys and addresses are unique within the blockchain address space and as such are unique to an individual blockchain user. However, the keys and addresses do not reveal information about that user's identity and are usually insufficient to comply with regulations, e.g. know your customer (KYC) regulations. In addition, blockchain keys and addresses typically do not interface with non-blockchain systems, which is required if blockchains are to be widely used and integrated within enterprise systems.

According to one aspect disclosed herein, there is provided a computer-implemented method of linking a first party and a second party, the method being performed by the first party and comprising: obtaining a first cryptographic public-private key pair comprising a first private key and a corresponding first public key; generating a first shared private key pair known to the first party and the second party; and generating a second cryptographic public-private key pair comprising a second private key and a corresponding second public key, wherein the second private key is generated based on the first private key and the shared private key.

The present disclosure recognizes a way in which one party can be cryptographically linked with another party using public-key cryptography. Due to the cryptographic nature of public and private keys, a link between the first and second parties cannot be forged and furthermore, the link can be verified by a third party. The second private key is generated based on the first private key and the shared private key. Only the first party knows the second private key, and only the first and second parties know the shared private key. Therefore, only the first party can generate the second private key, but the first party can prove, if required, that the second public key has been generated based on information that can be attested to by the second party. If the second party is a trusted party, their trust can be associated with the first party by the fact that they have established a shared private key with the first party. This enables the identity of the first party to be trusted.

The public-private key pairs may be blockchain key pairs. That is, the public key may be used as, or may be used to generate, an identity (i.e. address) of a blockchain user. However, the present disclosure is not limited to a blockchain system. That is, the first and/or second party need not be blockchain users, and their respective public-private key pairs need not be used to transact via the blockchain.

According to another aspect disclosed herein, there is provided a computer-implemented method of verifying a link between a first party and a second party, the method being performed by a third party and comprising: obtaining, from the second party, i) a message signed with a first signature based on a first private key of the second party, and ii) a first public key corresponding to the first private key; obtaining, from the second party, iii) the message signed with a second signature based on a second private key of the second party, and iv) a second public key corresponding to the second private key; obtaining, from the first party, v) the message signed with a third signature based on a shared private key known only to the first party and the second party, and a corresponding shared public key; and determining whether the second public key of the second party has been generated based on the first public key of the second party and the shared public key.

In this aspect, the third party wants to prove that there is a link between the first party and the second party. For example, the third party may trust the first party. By verifying the link between the first and second party, the third party can use its trust in the first party's identity to trust the identity of the second party. The third party obtains (e.g. receives) two messages from the second party, one signed with a signature based on a first private key known only to the second party, and one signed with a signature based on a second private key known only to the second party. The third party also obtains (e.g. receives) a message signed with a signature based on a private key known to both the first and second party. If the public key corresponding to the second private key has been generated based on the public key corresponding to the first private key and the public key corresponding to the shared private key, the third party can be sure that the first party established the shared private key with the second party. The third party can then use their trust in the first party to trust the second party.

According to another aspect disclosed herein, there is provided a computer-implemented method of attesting to a first signature used by a first party to sign a first message, wherein the blockchain comprises a recorded transaction, the recorded transaction comprising a registered value generated by applying a one-way function to a first value; the method being performed by the first party and comprising: generating the first signature by applying a one-way function to at least the first value and the message; transmitting a first transaction to one or more nodes of a blockchain network for inclusion in the blockchain, the first transaction comprising the message signed with the first signature; and transmitting a second transaction to one or more nodes of the blockchain network for inclusion in the blockchain, the second transaction comprising the first value.

In public key cryptography, signatures are usually generated using a private key and checked using the corresponding public key. The present disclosure provides a way in which signatures can be generated without using a party's private key, and a way in which that party can prove that only they could have provided the signature. The recorded value has been recorded (i.e. mined) to the blockchain and is therefore immutable. At this point, the first value is not recorded on the blockchain and is known only to the first party. The first party can generate a signature using the first value, sign a message using that signature and submit a transaction comprising the message to the blockchain. The first party can then follow up with a second transaction that comprises the first value, thereby attesting to the signature. This enables another party to apply the one-way function to the first value. If the result of applying the one-way function to the first value is the recorded value, the verifying party can be sure that only the first party could have generated the signature.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
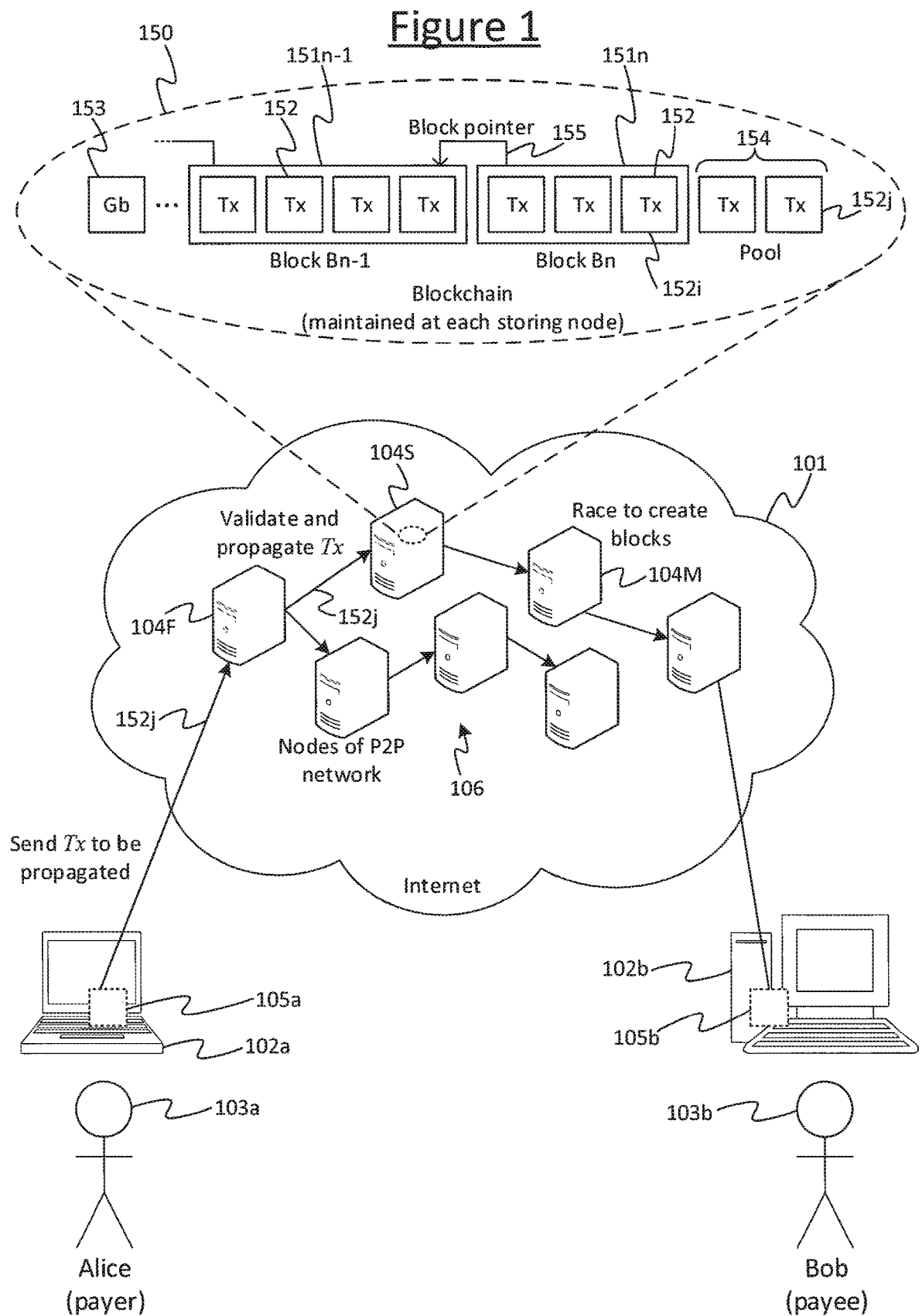
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Utxo-Based Model

Figure 2:
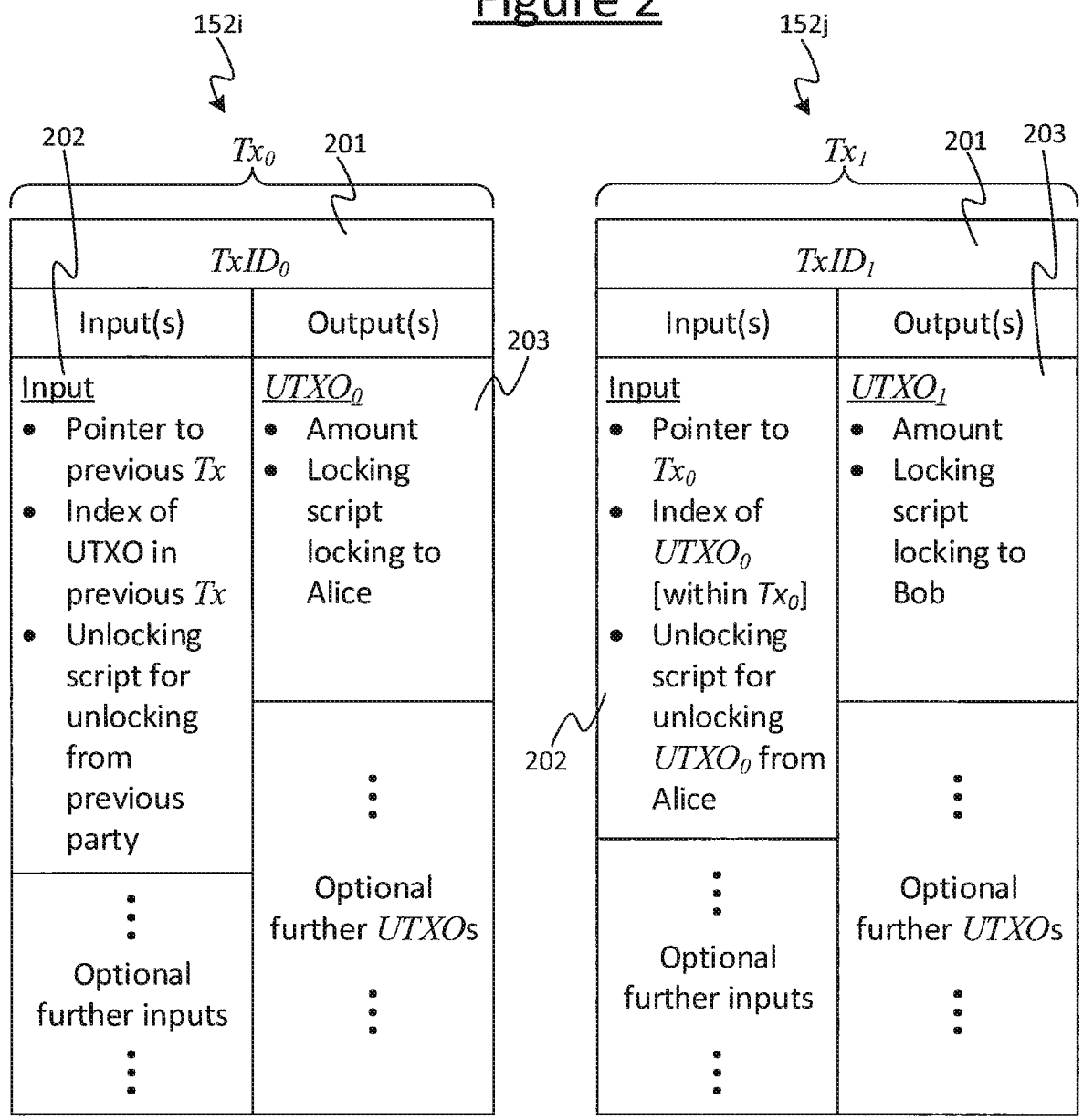
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig PA] which requires a signature Sig PA of Alice in order for $UTXO_0$ to be redeemed (strictly, in order for a subsequent transaction attempting to redeem $UTXO_0$ to be valid). [Checksig PA] contains the public key PA from a cryptographic public-private key pair of Alice. The input 202 of $Tx_1$ comprises a pointer pointing back to $Tx_0$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script < Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A><P_A>\|[Checksig P_A]$$

where "∥" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by cryptographic public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in UTXO$_0$, she can use the remainder to give herself change in a second output of Tx$_1$, or pay another party.

In practice Alice will also usually need to include a fee for the winning miner, because nowadays the reward of the generation transaction alone is not typically sufficient to motivate mining. If Alice does not include a fee for the miner, Tx$_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to UTXO$_0$ is the only input to Tx$_1$, and Tx$_1$ has only one output UTXO$_1$. If the amount of the digital asset specified in UTXO$_0$ is greater than the amount specified in UTXO$_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [CheckSigP$_A$] to mean [CheckSigP$_A$]= OP_DUP_OP_HASH160<H(Pa)> OP_EQUALVERIFY OP_CHECKSIG. "OP_..." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature P$_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
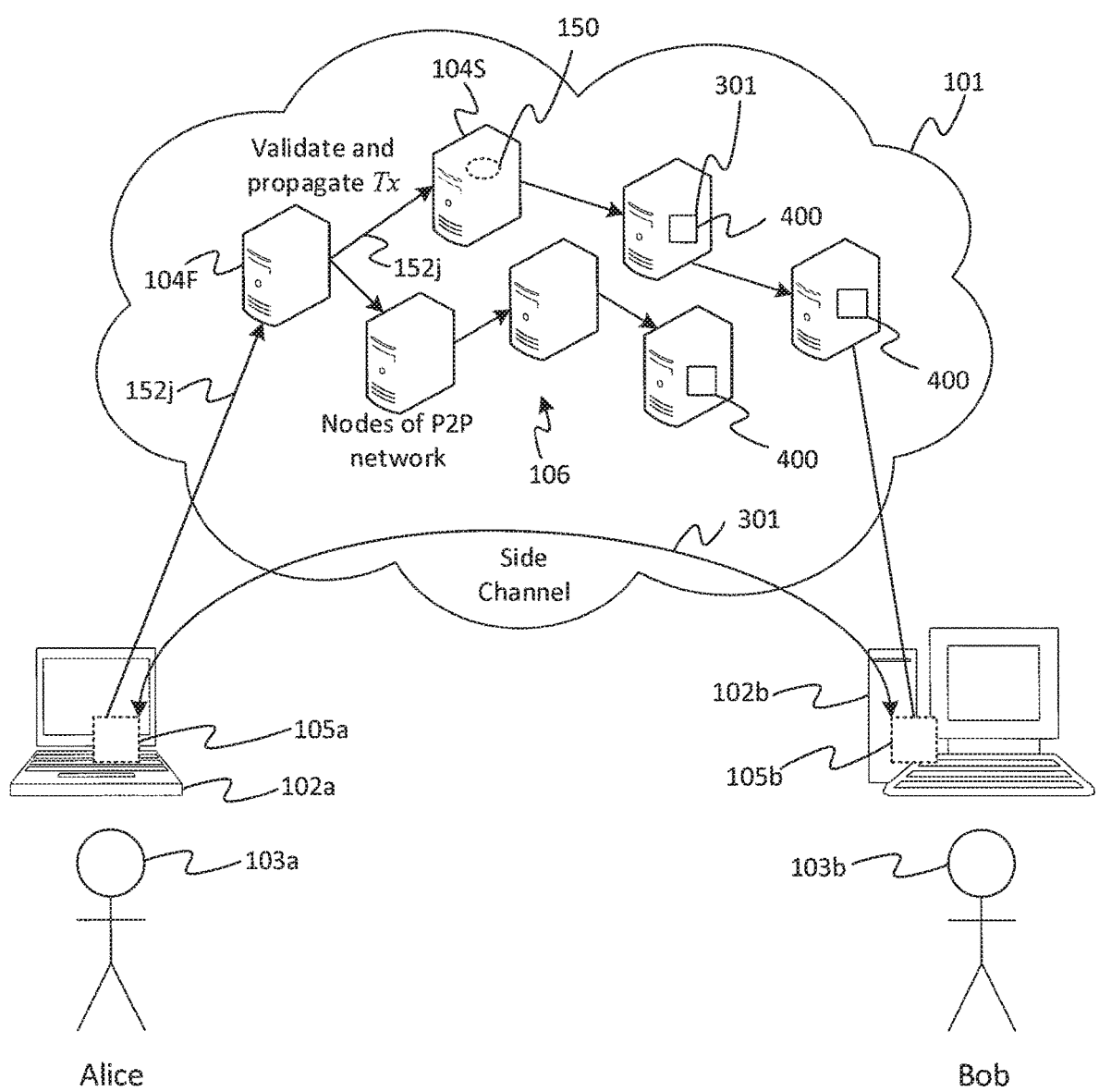
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Public Key Cryptography

Public key cryptography per se is well known and as such it will be only briefly described here. Public key cryptography is used as a basis for securing messages, e.g. transactions in a number of different blockchain architectures. Uses of public key cryptography include public key encryption and digital signature schemes. Public key cryptography is founded on the principle that certain functions are easy to compute but hard to reverse without some special knowledge. Easy to compute means it is computationally feasible to compute the result of the function for a given input (or set of inputs) in a reasonable time frame, and hard to reverse means that it is computationally infeasible to infer that input (or those inputs) from the result without knowledge of the input(s).

In the context of public key cryptography, a key public-private pair means a public key (which can be made freely available to anyone) and a corresponding private key (which is assumed to be secret in the sense that it is only known to a specific entity or group).

In a public key encryption context, encryption is performed using a public key whilst decryption is performed using the corresponding private key. In a digital signature context, signature generation is performed using a private key, whilst signature verification is performed using the corresponding public key.

In a blockchain context, digital signatures based on public key cryptography are used as a basis for cryptographically signing transactions and verifying transaction signatures.

Elliptic curve cryptography (ECC) is a form of public key cryptography which harnesses the mathematical properties of elliptical curves. The "Elliptic Curve Digital Signature Algorithm" (ECDSA) refers to a class of digital signature schemes which use ECC as a basis for digital signature generation and verification.

In the context of ECC, the addition, subtraction and multiplication operations are, respectively, elliptic curve point addition, denoted "+" herein, elliptic curve point subtraction, denoted "+" herein, and elliptic curve scalar multiplication, denoted " " herein. The addition and subtraction operations are each applied to two points on an elliptic curve and return a third point on the elliptic curve; however, the multiplication operation is applied to a scalar and a single point on an elliptic curve, and returns a second point on the elliptic curve. Elliptic curve arithmetic provides unique capabilities in obscuring a secret value and forms the basis of many contemporary cryptographic systems. In particular, reversing scalar multiplication of elliptic curve points over finite fields is an intractable problem (it is computationally infeasible to perform).

A private key V takes the form of an integer, and the corresponding public key P is a point P on the elliptic curve derived from a "generator point" G, which is also a point on the elliptic curve, as:

$$P = V \cdot G = \underbrace{G + \ldots + G}_{V \text{ times}}$$

where '.' denotes elliptic curve scalar multiplication on the elliptic curve defined elliptic curve parameters. For a sufficiently large V, actually performing V elliptic curve additions to derive P is hard, i.e. computationally infeasible. However, if V is known, then P can be computed much more efficiently by exploiting the algebraic properties of the elliptic curve operations. An example of an efficient algorithm that can be used to compute P is the "double and add" algorithm—crucially, this can only be implemented if V is known.

Conversely, if V is not known, then there is no computationally feasible way of deriving V (i.e. reversing the scalar multiplication) even if both G and P are known (this is the so-called "discrete-logarithm problem"). An attacker could attempt to "brute force" P by starting from G and repeatedly performing elliptic curve point additions until he gets to P; at that point, he would know V to be the number of elliptic curve point additions he had to perform; but that turns out to be computationally infeasible. Hence, V satisfies the requirements of a trapdoor in the above sense. In ECC, the public key P, generator key G and elliptic curve are public and assumed to be known, whereas the private key V is secret.

In a blockchain system, a user or other entity will typically hold a private key V that is used to prove their identity and the corresponding public key P would be calculated by:

$$P = V \cdot G$$

The private key V can be used sign a piece of data m ("the message") using the ECDSA. Further details of the ECDSA may for example be found in the following, which is incorporated herein by reference in its entirety: "RFC 6979-Deterministic Usage of the Digital Signature Algorithm (DSA) and Elliptic Curve Digital Signature Algorithm (ECDSA)", Tools.ietf.org, 2019.

Cryptographically Linked Identities

Figure 4:
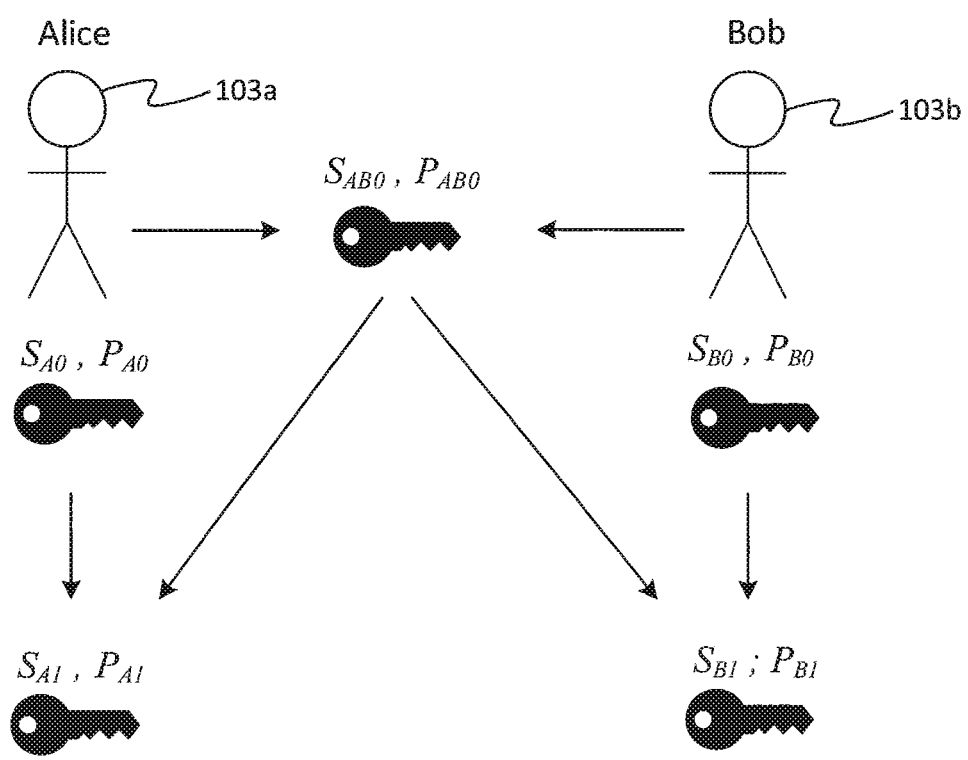
FIG. 4 schematically illustrates a method for cryptographically linking a first party and a second party.

Reference is now made to FIG. 4 which illustrates a method for cryptographically linking two parties. The following will be described in terms of the actions performed by the first party (e.g. Alice) 103a, but it will be appreciated that the second party (e.g. Bob) 103b may perform some or all of the same actions. The first and second party may be the same first and second party as described with reference to FIGS. 1 to 3. Alternatively, the first and/or second party may be non-blockchain users. In general, each party operates respective computer equipment configured to perform the actions of the respective party.

The two parties can be linked by exploiting the cryptographic properties of public key cryptography. The following will be described in terms of elliptic curve cryptography, but it will be appreciated that the teaching applies in general to other forms of public-key cryptography. Elliptic curve arithmetic can be used to provably link the identities of two parties using only their public keys and a public key generated from a shared secret key. As shown in FIG. 4, Alice 103a and Bob 103b each possess a respective public-private key pair. Alice 103a has a first private key $S_{A0}$ and a corresponding first public key $P_{A0}$. Similarly, Bob has a first private key $S_{B0}$ and a corresponding first public key $P_{B0}$. Alice 103a and Bob 103b also establish a shared secret key $S_{AB0}$ and a corresponding first public key $P_{AB0}$. The shared secret may be established using a side channel 301, as shown in FIG. 3. As implied by the name, a public key is assumed to be accessible by either party and/or an external third party. In contrast, a private key is assumed to be kept secret to the owner(s) of the private key.

Shared secret keys can be established using a Diffie-Helman key-exchange or an extension thereof. One technique for establishing the shared secret key is for each party to generate the shared secret key using their own private key (which may or may not be their first private key) and the other parties public key (which may or may not be the their first public key). For instance, Alice 103a uses her private key $S_A$ and Bob's public key $P_B$, and likewise Bob uses his private key $S_B$ and Alice's public key $P_A$ as follows:

$$S_{AB0} = [S_A S_B G]_x = [S_A P_B]_x = [S_B P_A]_x$$

where $[\ ]_x$ denotes the x coordinate of the elliptic curve point.

Given that only Alice 103a knows her private key $S_A$ and only Bob 103b knows his private key $S_B$, only Alice 103a and Bob 103b can calculate $S_{AB0}$. The shared private key $S_{AB0}$ can be established without divulging sensitive information, namely the private keys.

The following table illustrates the public and private keys owned by Alice 103a and Bob 103b. In this example, the public key is related to the private key by elliptic curve multiplication, P=S·G, where G is an elliptic curve generator point.

| Party | Private Key (S) | Public Key (P) |
|---|---|---|
| Alice | $S_{A0}$ | $P_{A0} = S_{A0} \cdot G$ |
| Bob | $S_{AB0}$ | $P_{AB0} = S_{AB0} \cdot G$ |
|  | $S_{B0}$ | $P_{B0} = S_{B0} \cdot G$ |

Alice 103a can then generate a second private key $S_{A1}$, referred to herein as an identity-linked key, using both her first private key $S_{A0}$ and the shared private key $S_{AB0}$. For instance, Alice's identity-linked key may be generated as $S_{A1}=S_{A0}+S_{AB0}$. Since only Alice 103a knows $S_{A0}$, only Alice can generate $S_{A1}$ and $P_{A1}$.

However, the public key can be verified by anyone since the public keys $P_{A0}$ and $P_{AB0}$ can be publicly known. The following equations show one example of how $P_{A1}$ can be derived by Alice 103a using her private keys and by another party using the publicly known keys:

$$P_{A1}=S_{A1} \cdot G$$

$$P_{A1}=(S_{A0}+S_{AB0}) \cdot G$$

$$P_{A1}=(S_{A0}G)+(S_{AB0} \cdot G)$$

$$P_{A1}=P_{A0}+P_{AB0}$$

Similarly, Bob 103b can generate an identity-linked key $S_{B1}$ using both his first private key $S_{B0}$ and the shared private key $S_{AB0}$. For instance, Bob's identity-linked key may be generated as $S_{B1}=S_{A0}+S_{B0}$. Since only Bob knows $S_{B0}$, only Bob can generate $S_{B1}$ and $P_{B1}$. More complex equations of $S_{A0}$ and $S_{AB0}$ may be used to generate $S_{A1}$. Similarly, more complex equations of $S_{B0}$ and $S_{AB0}$ may be used to generate $S_{B1}$.

Using the shared secret $S_{AB0}$, each party can verify the other party's identity. Since only Alice 103a and Bob 103b know the shared secret $S_{AB0}$, if Alice receives a message signed with $P_{AB0}$, she can be sure that the message is from Bob. Similarly, if Bob 103b receives a message signed with $P_{AB0}$, she can be sure that the message is from Alice. Remember that the corresponding private key is required to sign a message with a public key.

For security reasons, an identity-linked key should only be used once. To update an identity-linked key, Alice 103a and Bob 103b must establish an updated shared private key. Alice 103a and Bob 103b could communicate with each other to establish the updated shared private key. Alternatively, Alice 103a and Bob 103b could each apply the same one-way function (e.g. a hash function) to the initial shared private key. Applying the one-way function a pre-determined number of times (e.g. once) generates an updated shared private key. Applying the one-way function a pre-determined number of times (e.g. once) to the first updated shared private key generates a second updated private key. This method allows Alice 103a and Bob 103b to generate updated shared private keys on low-power devices using computationally efficient techniques. This method also generates a hierarchy of shared private keys, wherein each updated private key can be linked back to the initial shared private key.

One way to generate a sequence of shared public-private key pairs is by repeatedly hashing the initial shared secret:

$$P_{AB0} = S_{AB0} \cdot G$$

$$P_{AB1} = h(S_{AB0}) \cdot G$$

$$P_{AB2} = h^2(S_{AB0}) \cdot G$$

$$\vdots$$

$$P_{ABi} = h^i(S_{AB0}) \cdot G$$

Other ways of generating a sequence of updated shared keys are:

1. $P_i=[h^i(S_0)+h^i(P_{A-1}-P_{B-1})] \cdot G$

2. $P_i=h(S_{i-1}|S_{i-2}) \cdot G$

Each updated shared private key can be used to generate a respective updated identity-linked key. For example, the identity-linked keys of Alice 103a and Bob 103b can be updated as follows:

$$P_{A(i+1)}=P_{AB1}+P_{A0}$$

$$P_{B(i+1)}=P_{AB1}+P_{B0}$$

As these keys are updated, the respective parties will not be aware of the identity of the other party knowing only $P_{A(i+1)}$ or $P_{B(i+1)}$. However, the identity of one party (say Alice 103a) can be linked at any stage via a signature challenge if required.

Alice 103a can use any one of her identity-linked keys $P_{Ai}$ to sign a message and transmit the message to Bob 103b or a third party. In a blockchain context, Alice 103a can use one of her identity-linked keys to sign part or all of a blockchain transaction. For instance, Alice 103a may sign an input of a transaction. Alice 103a can then transmit the transaction to Bob, a third party, or one or more nodes of a blockchain network such that the transaction can be mined to the blockchain 150. An identity linked key allows Alice 103a to sign any part of a blockchain transaction. Furthermore, an identity linked key allows more than one party to sign part of a transaction. For instance, Alice 103a may sign the (part of) the transaction, then transmit the transaction to Bob 103b who also signs the same (part of) the transaction, and then Alice 103a or Bob can transmit the transaction to the blockchain network.

Verifying Cryptographically Linked Parties

Figure 5:
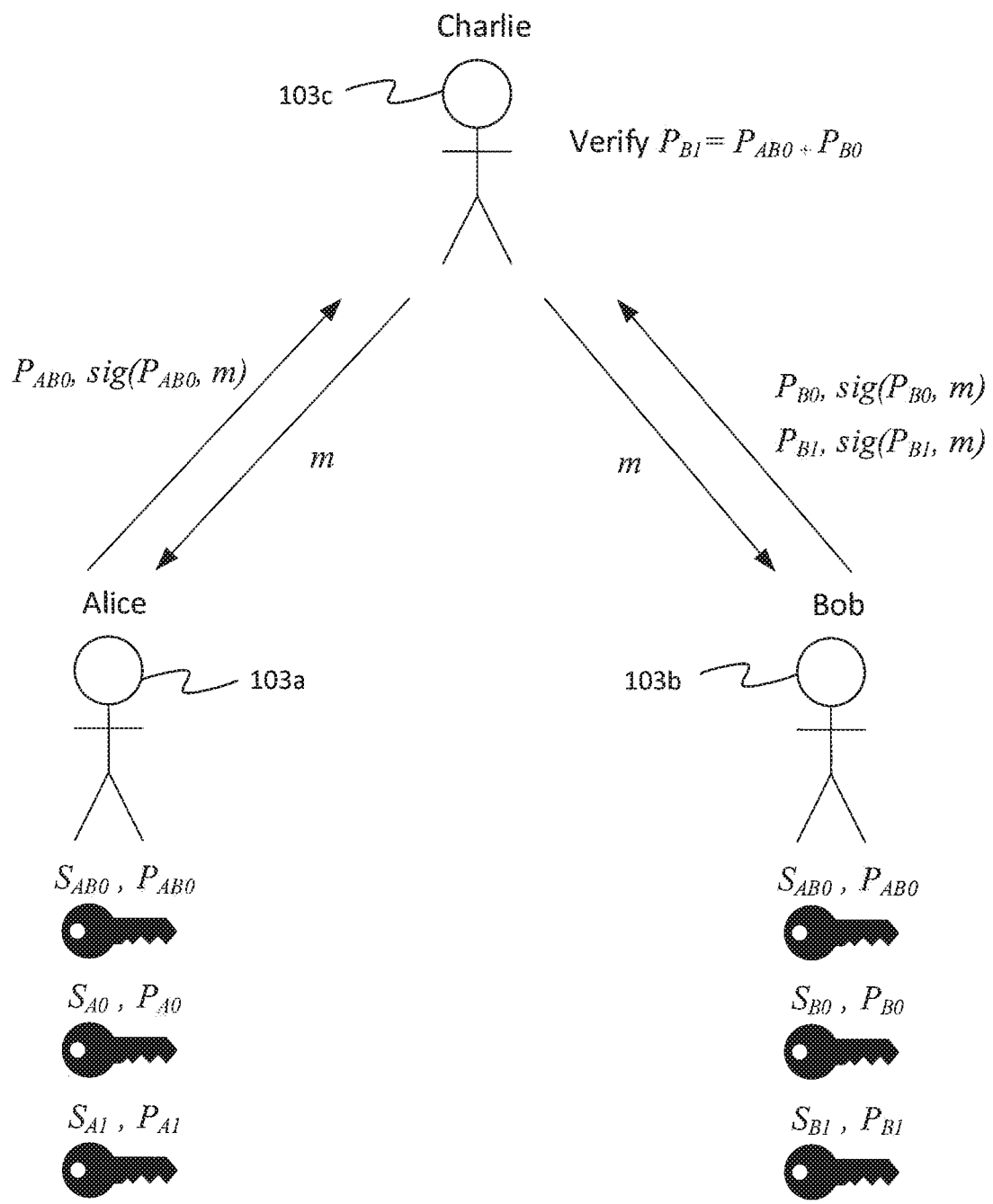
FIG. 5 schematically illustrates a method for verifying whether a first party is cryptographically linked with a second party.

FIG. 5 illustrates a method that a third party (Charlie) 103c can use to verify if a first and second party are linked cryptographically. Whilst not shown in FIG. 5, Charlie comprises computer equipment comprising processing apparatus comprising one or more processors, e.g. one or more central processing units (CPUs), accelerator processors, application specific processors and/or field programmable gate arrays (FPGAs). The computer equipment also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

As shown in FIG. 5, Alice 103a possesses her first private key $S_{A0}$, the shared private key $S_{AB0}$ and her second private key (i.e. her identity linked key) $S_{A1}$. Similarly, Bob 103b possesses his first private key $S_{B0}$, the shared private key $S_{AB0}$ and his second private key (i.e. her identity linked key) $S_{B1}$. In this example, one of Alice 103a or Bob 103b may be a trusted party. If Alice 103a is a trusted party, Charlie 103c can use his trust in Alice's identity to trust Bob's identity. To do this, Charlie 103c can verify that Bob has an identity-linked key linked with Alice. Charlie 103c can have Bob 103b prove his relationship with Alice 103a using the dependence of the identity linked key on the shared secret. Charlie 103c obtains a message from Bob 103b which is signed using Bob's first public-private key pair. Charlie 103c also obtains a message from Bob 103b which is signed with his identity-linked public-private key pair. Bob 103b may choose the message to transmit to Charlie 103c. Alternatively, Charlie 103c may transmit a message (e.g. a challenge) to Bob 103b for him to sign. Charlie 103c also obtains the message from Alice 103a which is signed with the shared public-private key pair. Again, Alice 103a may transmit the message by deciding on the message with Bob 103b, or Charlie 103c may transmit the message to Alice 103a. Charlie 103c may first obtain the messages from Bob 103b or from Alice 103a. Once Charlie 103c has the signed messages, Charlie 103c verifies that Bob's identity-linked key has been generated based on the shared private key. Charlie 103c verifies this by determining checking whether the identity-linked public key has been generated based on Bob's first public key and the shared public key, e.g. $P_{B1} = P_{AB0} + P_{B0}$.

Charlie may obtain the signed messages from Alice and/or Bob over the internet, e.g. using a side channel 301 as shown in FIG. 3.

Once verified, this proves an unforgeable connection between Alice 103a and Bob 103b. Charlie 103c may also perform checks to verify that the signatures produced by Alice and Bob are valid signatures. Furthermore, Charlie 103c can have Alice 103a and Bob 103b transmit the messages using one or more blockchain transactions. For instance, the signed messages may be included in an output of a blockchain transaction. Charlie 103c can then create a transaction having the output as an input to his transaction. The input may contain script for verifying the relationship between Alice 103a and Bob's public keys. Once verified, the relationship will be stored immutably on the blockchain 150.

Whilst the techniques above have been described with reference to Alice 103a and Bob 103b, in general the first and second parties may be the same entity (e.g. the same person, company, organisation, etc.). For example, the first party may want to cryptographically link their (trusted) identity with another identity, e.g. by linking one of their public keys with a secret that only they know. Similarly, the first private key of each party need not utilize the same public key cryptography system. For instance, Alice 103a may utilize elliptic curve cryptography whilst Bob utilizes RSA encryption or DSA encryption. Similarly, the first private key of Alice and/or Bob and the shared private key may utilize different cryptography systems. In some examples, if different cryptography systems are used, at least one of the private keys may require padding or truncating to reflect the other private scheme.

Take for example a non-blockchain system such as a government or bank with a sufficiently rigorous know your customer (KYC) system. A known user, say Alice 103a, will have a private key ($S_{A0}$) connected to her identity via a public key $P_{A0}$. This may be verified by the bank or government and can be publicly attested. Alice 103a can provably link her blockchain identity ($S_{B0}$, $P_{B0}$) to this off-chain system using the methods described above and derive subsequent keys or a hierarchy of keys that can all be linked to her off-chain identity by calculating her identity linked key as $P_{B1} = (S_{B0} + S_{AB0}) \cdot G$ as above. This can then be used as her blockchain identity and can be provably linked to $P_{A0}$ using $P_{AB0}$. This not only gives KYC features to her blockchain identity but also gives blockchain capabilities to her off-chain account with the government and bank. That is, she can use the identity-linked key to participate in blockchain systems and this can be used to update (e.g. credit or debit) her off-chain account without the bank or government publishing to the blockchain 150.

Access Chains

Using the data-storage capabilities of blockchains allows a party to leverage the intrinsic cryptographic signature schemes to act as signatures for the encapsulating data. However, usually the underlying protocol of a blockchain 150 is be fixed and thus cannot be tailored for specific applications. This requires parties to have a valid private key restricting use to those that are already a part of the system. As well, there is no way to delegate the ability to sign without exposing a party's private key. The present disclosure provides a second-layer signature protocol that can be included within a blockchain transaction allowing multiple parties to be included in a single transaction.

One-way functions (e.g. cryptographic hash functions) provide an efficient, deterministic method of obscuring an input such that given an output it is infeasible to find the input. Hash functions (or one-way functions in general) can be used to generate "tokens" which can be supplied to parties, redeemed by said parties and transferred between different parties. Tokens can be generated through repeated hashing of a seed value to form what is termed an access chain.

Using a pre-agreed number (n) of events requiring a token for access the user applies the hash function (h) to a secret key (K) n times ($h^n(K)$). This value is then registered, e.g. with a service provider, by publishing it on the blockchain 150. A party can then redeem a token by providing the pre-image of the registered value on a blockchain 150, which becomes the new registered value. For instance, if the token $t_n = h^n(K)$ is currently published on the blockchain 150, the token can be redeemed by supplying $t_{n-1} = h^{n-1}(K)$.

At any point the token owner can transfer the remaining tokens to another party, e.g. by finding a willing buyer and agreeing on a price for the tokens. If Alice 103a is owner of the currently registered token, Alice 103a provides her latest pre-image to prove her identity to the service provider along with the new party's newly generated registered value of their access chain.

These tokens can also be provably linked to public keys by generating a new private key $S_i$ with each redemption as the sum of the root private key $S_0$ and the next pre-image in the chain $t_i$, ($s_i = S_0 + t_i$).

In addition to providing tokens, access chains provide a way of linking signatures for a pre-determined number of messages. These signatures can be applied directly to a chunk of data rather than an entire transaction. Take, for example, a hash chain of length n. That is:

$$t_n = h^n(K)$$

$$t_{n-1} = h^{n-1}(K)$$

$$\vdots$$

$$t_i = h^i(K)$$

$$\vdots$$

$$t_1 = h(K)$$

$$t_0 = K$$

In such a chain, $t_n=h(t_{n-1})$ forms the chain of hashes. The final value $t_n$ is registered to a given public key (or address) by publishing it to the blockchain 150. Providing the pre-image that solves the latest registered value can act as a signature to a message or other data that may be included within a transaction. This signature is publicly verifiable and can only be provided by the token owner. However, this method is susceptible to a replay attack, where an attacker can create a malicious transaction once viewing the signature value.

Techniques described herein provide a secure, two-stage signing process where one transaction is used to provide a signature, and another transaction is used to attest to the signature.

A first party, e.g. Alice 103a, has the pre-image (first value) to a token (recorded value) that is recorded on the blockchain 150. The recorded value is generated by applying a one-way function (e.g. a hash function) to the first value. Alice 103a, when wanting to sign a message, can generate a signature for the message by applying a one-way function to at least the first value and the message. Alice 103a can then construct a transaction containing the signed message and transmit the transaction to the blockchain network 106. Alice 103a can then construct a second transaction that comprises the first value (i.e. the pre-image to the recorded value) and transmit the transaction to the blockchain network. The first and second transactions may either be the same transaction or different transactions.

Now, the first value is also recorded on the blockchain 150 and thus is a newly registered value (or an updated registered value). Alice 103a can repeat the above process to sign a second message. That is, Alice 103a generates a signature by hashing the pre-image of the newly registered value and the message. Alice 103a transmits a transaction (this transaction may be the same as the second transaction or a different transaction) comprising the signed message to the blockchain network 106. Alice 103a then transmits a transaction comprises the pre-image to the updated registered value to the blockchain network. This process can be repeated until the seed value is revealed.

In some examples, instead of hashing the pre-image and the message, Alice 103a hashing the pre-image and a hash of the message. For example, Alice 103a may have generated an access chain with $t_0, \ldots, t_n$ as defined above and the $n^{th}$ message $m_n$ to be signed. The value $t_{n+1}=h(t_n)$ is currently registered on the blockchain 150 and, as such, Alice can construct the signature of the message $m_n$ using both the hash of the message and the pre-image of the latest registered value as:

$$h(t_n + h(m_n))$$

Where, again, $t_0 = h^n(K)$. At this point, if and when the transaction including the signature is included in a block, the signature cannot be verified. To do this, Alice 103a constructs an attestation transaction where $t_0$ is provided and registered as the latest value in the access chain registered on the blockchain 150.

By providing this value, both the access chain can be verified by checking that $h(t_n)=t_{n+1}$ as well that $h(t_i+h(m_i))$ agrees with the data provided in the signature (first) transaction. This two-stage signing process where the user attests nominally and when it is complete, sends a verification and attestation.

The one-way function used by Alice 103a may be a hash-based message authentication code (HMAC). A HMAC is a tabulated value taking a message m and key K to provide a verification of the message. HMACs are a category of message authentication codes (MACs) exploiting the pre-image and collision resistance of cryptographic hash functions to prevent exposure of the key used to calculate the HMAC. This is widely applied in secure message transmission and transmission error detection as a small change in the input typically results in a significant change in the output of a hash function.

Let h(x) be the hash function evaluated at the value x. The HMAC is defined as:

$$HMAC(K, m) = h\{(K' \oplus Opad) \| h[(K' \oplus Ipad) \| m]\}$$

$$K' = \begin{cases} h(K), & \text{if } K \text{ is larger than block size} \\ K, & \text{otherwise} \end{cases}$$

This can serve as a secure signature scheme that can be applied directly to a piece of data (in this case the message m). This can be published to a blockchain 150 followed by an attestation by providing the key K that can verify the signature.

Using a secret key, K, an access chain n levels deep can be formed. That is:

$$t_1 = h(K)$$

$$t_2 = h^2(K)$$

$$\vdots$$

$$t_n = h^n(K)$$

where K is the ultimate secret and $t_n$ is the initial registered value on the blockchain 150. Alice 103a can then use HMAC($t_{n-1}$,m) as a signature of m. A verifying party (e.g. Bob) can then use the newly exposed value to check that indeed $H(t_{n-1})=t_n$ and calculate that HMAC'($K_{n-1}$,m) matches the registered value. The exposure of the pre-image acts as an attestation to the signature. Again, this process can be repeated to generate and attest to a new signature for each message to be signed.

This relationship gives the signatures a finite lifetime until the next value in the access chain is exposed. It also allows for delegation of signatures as the signer (Alice 103a) can provide the next one or more values in the access chain (without revealing the root of the access chain) to a second party (e.g. Bob 103b) who can submit the signatures on her behalf. This process requires a degree of trust between the access chain holder and the delegate as the raw key would be possessed by the delegate. The delegate may be required to submit at least one transaction signed using their public key which can be connected to them. Therefore, if the delegate should abuse the key, they can be identified using the transaction signature.

As an example use case, in many legal scenarios, contract conditions may change regularly to accommodate new legislation introduced in various jurisdictions. This often requires alterations of many contracts in similar or nearly identical ways. The schemes presented above provide methods to apply signatures to a finite and pre-determined number of documents using access chains. Take for example a legally binding contract $m_0$ and a signee with a secret K. The signee can publish $t_n = h^n(K)$ to the blockchain 150. Using the preimage of the published $h^n(K)$, a signature can be generated using either the hash of the pre-image of the message $(h(t_{n-1} + h(m_0)))$ followed by an attestation by providing $t_{n-1}$ or by using the HMAC scheme HMAC$(t_{n-1}, m)$ for additional security. If the contract needs to be amended the amendment $(m_1)$ can then be signed by the signee using the next value in the chain. Thus, a full record of all contract states will be recorded immutably and time-stamped on the blockchain 150. As they are applied to the data (in this case the contract amendment) directly and subsequently attested to, multiple signatures can also be batched into a single transaction for efficient management of a large number of contracts.

Identity-Linked Access Chains

As set out above, Alice 103*a* and Bob 103*b* can each derive an identity-linked key that is provably related to the other party. Instead of using the identity-linked key directly, Alice and Bob can each use their respective identity-linked key to derive a new shared secret. As set out above, Alice and Bob's respective identity-linked keys are generated as:

$$P_{A1} = (S_{A0} + S_{AB0}) \cdot G$$

$$P_{B1} = (S_{B0} + S_{AB0}) \cdot G$$

From this, Alice 103*a* and Bob 103*b* can each calculate a derived shared secret ("a first derived shared private key") as:

$$S_{AB1} = [S_{A1} S_{B1} G]_x = [S_{A1} P_{B1}]_x = [S_{B1} P_{A1}]_x,$$

where $[\ ]_x$ denotes the x coordinate of the elliptic curve point. This newly derived shared secret or a key derived from it can then serve as a seed in an access chain. As, ultimately, the root of an access chain is exposed, using a derived key does not compromise the initial shared secret $S_{AB0}$ so a new chain can be created again. For instance, a new chain can be calculated using $S_{AB1}$.

Taking, for example, a 100 level deep access chain, with $t^n = h^n(S_{AB1})$, Alice 103*a* can generate:

$$t_{100} = h^{100}(S_{AB1})$$

$$t_{99} = h^{99}(S_{AB1})$$

$$\vdots$$

$$t_1 = h(S_{AB1})$$

$$t_0 = S_{AB1}$$

Alice can publicly register $t_{100}$ by including it in a transaction and transmitting the transaction to the blockchain network to be stored on the blockchain 150. Bob 103*b* can then verify Alice's identity by calculating the value himself (as he also knows $S_{AB1}$ as well).

Should one party suspect that the other party has been compromised by exposure of $S_{AB1}$, they can require a challenge solution that requires the next value required that only the two original parties can perform. Bob 103*b* can send a challenge message $(m_c)$ and the expected form to Alice 103*a*, both encrypted using $S_{AB0}$ or a key derived from it. Since $S_{AB0}$ was not used in the compromised access chain there is no way for it be compromised as well, and as such no way for anyone other than Alice 103*a* to know the challenge message and the required form of response. If $t^{n+1}$ is the latest value recorded on the blockchain 150, the required response can take a form such as one of the following:

$$y = h(h^n(S_{AB1}) \| m_c)$$

$$y = h(h^n(S_{AB1}) \oplus m_c)$$

where $\|$ denotes concatenation and $\oplus$ refers to an XOR operation. Here, $h^n(S_{AB1})$ is the value in the sequence immediately preceding the latest value recorded on the blockchain. E.g. if $t^{100}$ is recorded on the blockchain, $h^n(S_{AB1}) = t^{99}$ If Alice 103*a* reports with this key Bob 103*b* can be sure of her identity. However, Bob 103*b* may also require Alice 103*a* to answer in this form for the remainder of the chain. The chain can be continued to be used despite the potential security breech. However, a new access chain can also be created using a newly derived key if desired by either party.

An example use case will now be described. Audits provide an independent evaluation of a wide range of business processes including financial reporting, regulatory compliance, and product quality. Third-party auditors may form an essential part of a supply chain, particularly if a business is producing products that will end up in the hands of consumers. Currently, many of these auditors do not have the option to integrate with blockchain systems. Using an identity-linked access chain, the authenticity of the attestation can be verified using the linked identity and updated at whatever frequency is required by the auditing body.

The auditing body must declare a public key $P_m$, which would have sufficiently rigorous KYC procedures. An auditor can link his or her identity to the auditing body via a calculated shared key pair $(S_{AB1}, P_{AB1})$, e.g. calculated via a Diffie-Helman exchange. This can act as the root of an access chain $t_n = h^n (S_{AB1})$ where the initial value $t_n$ is registered by the auditing body. The individual auditor can then perform the required compliance investigation and provide certification of the compliance $m_0$ using a signature method as described above, recording the pre-image of the latest registered value on the blockchain 150. This certification can be given an expiry where another compliance audit must take place. At each renewal, the required reporting conditions can be verified, and the signature is withheld if the conditions are not satisfied. This provides an immutable record of compliance, traceable back to the individual auditor and with a verifiable connection to the auditing body.

CONCLUSION

It will be appreciated that the above embodiments have been described by way of example only.

More generally, according to a first instantiation of the teachings disclosed herein, there may be provided a computer-implemented method of linking a first party and a second party, the method being performed by the first party and comprising: obtaining a first cryptographic public-private key pair comprising a first private key and a corresponding first public key; generating a first shared private key pair known to the first party and the second party; and generating a second cryptographic public-private key pair comprising a second private key and a corresponding second public key, wherein the second private key is generated based on the first private key and the shared private key.

According to an optional, second instantiation of the teachings disclosed herein, there may be provided a method in accordance with the first instantiation, comprising: generating one or more updated shared private keys, each updated shared private key known to the first party and the second party; and generating one or more updated second cryptographic public-private key pairs, each comprising a respective updated second private key and a corresponding updated second public key, wherein each respective updated second private key is generated based on the first private key and a different one of the one or more updated shared private keys.

In some embodiments, a plurality of updated shared private key pairs are generated, and a plurality of updated second cryptographic public-private key pairs are generated, and wherein each respective updated second private key is generated based on the first private key and a different one of the plurality of updated shared private keys.

According to an optional, third instantiation of the teachings disclosed herein, there may be provided a method in accordance with the second instantiation, wherein the one or more updated shared private keys form a sequence of keys starting with the first shared private key, and wherein each next private key in the sequence is generated by applying a one-way function to at least the previous shared private key in the sequence.

According to an optional, fourth instantiation of the teachings disclosed herein, there may be provided a method in accordance with any of the first to third instantiations, comprising: obtaining a second public key of the second party, wherein the second public key of the second party is generated based on a first private key of the second party and the first shared private key; and generating a derived shared private key based on the second private key of the first party and the second public key of the second party.

According to an optional, fifth instantiation of the teachings disclosed herein, there may be provided a method in accordance with the fourth instantiation, comprising: generating a sequence of values, wherein an initial value in the sequence is the derived shared private key or is generated by applying a one-way function to the derived shared private key, and wherein each next value in the sequence is generated by applying the one-way function to at least the previous value in the sequence.

According to an optional, sixth instantiation of the teachings disclosed herein, there may be provided a method in accordance with the fifth instantiation, comprising: transmitting a blockchain transaction to one or more nodes of a blockchain network for inclusion in the blockchain, wherein the blockchain transaction comprises a latest value in the sequence of values.

For example, the latest value in the sequence may be final (i.e. last) value. Alternatively, the latest value in the sequence may a previous value in the sequence. For instance, the final $n^{th}$ value may be submitted to the blockchain, then the $n-1^{th}$ value, then the $n-2^{th}$ value, and so on.

According to an optional, seventh instantiation of the teachings disclosed herein, there may be provided a method in accordance with the sixth instantiation, comprising: receiving a challenge message from the second party, the challenge message being encrypted based on the first shared private key; generating a response to the challenge message, wherein the response it based on the challenge message and a value immediately preceding the latest value in the sequence of values; and transmitting the response to the second party.

According to an optional, eighth instantiation of the teachings disclosed herein, there may be provided a method in accordance with the seventh instantiation, comprising: receiving an expected form of the response from the second party, the expected form being encrypted based on the first shared private key, and wherein the generated response is further based on the expected form.

According to an optional, ninth instantiation of the teachings disclosed herein, there may be provided a method in accordance with any of the first to eighth instantiations, wherein the first shared private key is generated based on a private key of a third cryptographic public-private key pair of the first party and a public key of a cryptographic public-private key pair of the second party.

The first shared private key can also be generated from a third public key of the third cryptographic public-private key pair of the first party and a private key of the cryptographic public-private key pair of the second party.

According to an optional, tenth instantiation of the teachings disclosed herein, there may be provided a method in accordance with any of the first to ninth instantiations, wherein the first and second parties are a same party.

According to an optional, eleventh instantiation of the teachings disclosed herein, there may be provided a method in accordance with any of the first to ninth instantiations, wherein the first and second parties are different parties.

According to an optional, twelfth instantiation of the teachings disclosed herein, there may be provided a method in accordance with any of the first to eleventh instantiations, comprising: signing a message with a signature based on the second private key of the first party; and transmitting the signed message to the second party and/or a third, different party.

According to an optional, thirteenth instantiation of the teachings disclosed herein, there may be provided a method in accordance with any of the first to twelfth instantiations, comprising: signing at least part of blockchain transaction with a signature based on the second private key of the first party; and transmitting the blockchain transaction to one or more nodes of a blockchain network for inclusion in the blockchain.

According to a fourteenth instantiation of the teachings disclosed herein, there is provided a computer-implemented method of verifying a link between a first party and a second party, the method being performed by a third party and comprising: obtaining, from the second party, i) a message signed with a first signature based on a first private key of the second party, and ii) a first public key corresponding to the first private key; obtaining, from the second party, iii) the message signed with a second signature based on a second private key of the second party, and iv) a second public key corresponding to the second private key; obtaining, from the first party, v) the message signed with a third signature based on a shared private key known only to the first party and the second party, and a corresponding shared public key; and determining whether the second public key of the second party has been generated based on the first public key of the second party and the shared public key.

According to an optional, fifteenth instantiation of the teachings disclosed herein, there may be provided a method in accordance with the fourteenth instantiation, wherein said determining comprises determining whether the first, second and third signatures are valid signatures.

According to an optional, sixteenth instantiation of the teachings disclosed herein, there may be provided a method in accordance with the fourteenth or fifteenth instantiations, comprising: transmitting the message to the first and second parties.

According to an optional, seventeenth instantiation of the teachings disclosed herein, there may be provided a method in accordance with the fourteenth or sixteenth instantiations, wherein the first and second parties are a same party.

According to an optional, eighteenth instantiation of the teachings disclosed herein, there may be provided a method in accordance with the fourteenth or sixteenth instantiations, wherein the first and second parties are different parties.

According to a nineteenth instantiation of the teachings disclosed herein, there is provided a computer-implemented method of attesting to a first signature used by a first party to sign a first message, wherein the blockchain comprises a recorded transaction, the recorded transaction comprising a registered value generated by applying a one-way function to a first value; the method being performed by the first party and comprising: generating the first signature by applying a one-way function to at least the first value and the message; transmitting a first transaction to one or more nodes of a blockchain network for inclusion in the blockchain, the first transaction comprising the message signed with the first signature; and transmitting a second transaction to one or more nodes of the blockchain network for inclusion in the blockchain, the second transaction comprising the first value.

According to an optional, twentieth instantiation of the teachings disclosed herein, there may be provided a method in accordance with the nineteenth instantiation, wherein the first value is an updated registered value and is generated by applying a one-way function to a second value, and wherein the method comprises: generating a second signature by applying a one-way function to at least the second value and the second message; transmitting a third transaction to one or more nodes of a blockchain network for inclusion in the blockchain, the third transaction comprising the second message signed with the second signature; and transmitting a fourth blockchain transaction to one or more nodes of the blockchain network for inclusion in the blockchain, the fourth transaction comprising the second value.

According to an optional, twenty first instantiation of the teachings disclosed herein, there may be provided a method in accordance with the nineteenth or twentieth instantiations, wherein the first signature is generated by applying a one-way function to at least i) the first value, and ii) a result of applying a one-way function to the first message.

For instance, the first signature may be generated by hashing the first message, and then hashing a combination of the first value and the hash of the first message.

According to an optional, twenty second instantiation of the teachings disclosed herein, there may be provided a method in accordance with any of the nineteenth to twenty first instantiations, wherein the first signature is a hash-based message authentication code.

According to an optional, twenty third instantiation of the teachings disclosed herein, there may be provided a method in accordance with any of the nineteenth to twenty second instantiations, wherein said transmitting of the second transaction comprises transmitting the second transaction to one or more nodes of the blockchain network after the first transaction is included in the blockchain.

According to an optional, twenty fourth instantiation of the teachings disclosed herein, there may be provided a method in accordance with any of the nineteenth to twenty third instantiations, wherein the recorded value and the first value are part of a sequence of values, and wherein each next value in the sequence is generated by applying a one-way function to a previous value in the sequence.

According to an optional, twenty fifth instantiation of the teachings disclosed herein, there may be provided a method in accordance with the twenty fourth instantiation, comprising transmitting one or more values in the sequence of values to a second party.

According to an optional, twenty sixth instantiation of the teachings disclosed herein, there may be provided a method in accordance with any of the nineteenth to twenty fifth instantiations, wherein the first and third transactions are a same transaction, and/or wherein the second and fourth transactions are a same transaction.

According to an optional, twenty seventh instantiation of the teachings disclosed herein, there may be provided a method in accordance with any of the first to twenty sixth instantiations, wherein the one-way function is a cryptographic hash function.

According to a twenty eighth instantiation of the teachings disclosed herein, there is provided computer equipment of the first party, comprising: memory comprising one or more memory units; and processing apparatus comprising one or more processing units, wherein the memory stores code arranged to run on the processing apparatus, the code being configured so as when on the processing apparatus to perform the method of any of the first to thirteenth instantiations.

According to a twenty ninth instantiation of the teachings disclosed herein, there is provided a computer program embodied on computer-readable storage and configured so as, when run on computer equipment of the first party, to perform the method of any the first to thirteenth instantiations.

According to a thirtieth instantiation of the teachings disclosed herein, there is provided computer equipment of the third party, comprising: memory comprising one or more memory units; and processing apparatus comprising one or more processing units, wherein the memory stores code arranged to run on the processing apparatus, the code being configured so as when on the processing apparatus to perform the method of any of the fourteenth to eighteenth instantiations.

According to a thirty first instantiation of the teachings disclosed herein, there is provided a computer program embodied on computer-readable storage and configured so as, when run on computer equipment of the third party, to perform the method of any of the fourteenth to eighteenth instantiations.

According to a thirty second instantiation of the teachings disclosed herein, there is provided computer equipment of the first party, comprising: memory comprising one or more memory units; and processing apparatus comprising one or more processing units, wherein the memory stores code arranged to run on the processing apparatus, the code being configured so as when on the processing apparatus to perform the method of any of the nineteenth to twenty seventh instantiations.

According to a thirty third instantiation of the teachings disclosed herein, there is provided a computer program embodied on computer-readable storage and configured so as, when run on computer equipment of the first party, to perform the method of the nineteenth to twenty seventh instantiations.

According to another instantiation of the teachings disclosed herein, there may be provided a method comprising the actions of the first party, the second party, and/or the third party.

According to another instantiation of the teachings disclosed herein, there may be provided a system comprising the computer equipment of the first party, the second party, and/or the third party.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of attesting to a first signature used by a first party to sign a first message, wherein a blockchain comprises a recorded transaction, and the recorded transaction comprises a registered value generated by applying a one-way function to a first value, the method being performed by the first party and comprising:
generating the first signature by applying a first one-way function to at least the first value and the first message;
transmitting a first transaction to one or more nodes of a blockchain network for inclusion in the blockchain, the first transaction comprising the first signature; and
transmitting a second transaction to one or more nodes of the blockchain network for inclusion in the blockchain, the second transaction comprising the first value,
wherein a second party is configured to verify the first signature was generated by the first party by:
generating a candidate first signature by applying the first one-way function to the at least the first value and the first message; and
verifying that the candidate first signature matches the first signature.

2. The method of claim 1, wherein the first value is an updated registered value and is generated by applying a one-way function to a second value, and wherein the method comprises:
generating a second signature by applying a second one-way function to at least the second value and a second message;
transmitting a third transaction to one or more nodes of the blockchain network for inclusion in the blockchain, the third transaction comprising the second signature; and
transmitting a fourth blockchain transaction to one or more nodes of the blockchain network for inclusion in the blockchain, the fourth blockchain transaction comprising the second value.

3. The method of claim 2, wherein the first and third transactions are a same transaction, and/or wherein the second and fourth transactions are a same transaction.

4. The method of claim 1, wherein the first signature is generated by applying the first one-way function to at least i) the first value, and ii) a result of applying a third one-way function to the first message.

5. The method of claim 1, wherein the first signature is a hash-based message authentication code.

6. The method of claim 1, wherein said transmitting of the second transaction comprises transmitting the second transaction to one or more nodes of the blockchain network after the first transaction is included in the blockchain.

7. The method of claim 1, wherein the registered value and the first value are part of a sequence of values, and wherein each next value in the sequence is generated by applying a fourth one-way function to a previous value in the sequence.

8. The method of claim 7, comprising transmitting one or more values in the sequence of values to a second party.

9. Computer equipment comprising:
memory comprising one or more memory units;
processing apparatus comprising one or more processing units; and
a network interface comprising one or more network interface;
wherein the memory stores code arranged to run on the processing apparatus, the code being configured so as when run on the processing apparatus, the processing apparatus operates the computer equipment to perform a method of attesting to a first signature used by a first party to sign a first message, wherein a blockchain comprises a recorded transaction, and the recorded transaction comprises a registered value generated by applying a one-way function to a first value, the method being performed by the first party and comprising:
generating the first signature by applying a first one-way function to at least the first value and the first message;
transmitting a first transaction to one or more nodes of a blockchain network for inclusion in the blockchain, the first transaction comprising the first signature; and
transmitting a second transaction to one or more nodes of the blockchain network for inclusion in the blockchain, the second transaction comprising the first value,
wherein a second party is configured to verify the first signature was generated by the first party by:
generating a candidate first signature by applying the first one-way function to the at least the first value and the first message; and
verifying that the candidate first signature matches the first signature.

10. The computer equipment of claim 9, wherein the first value is an updated registered value and is generated by applying a one-way function to a second value, and wherein the code is configured so as when run on the processing apparatus, the processing apparatus operates the computer equipment to:
generate a second signature by applying a second one-way function to at least the second value and a second message;
transmit a third transaction to one or more nodes of the blockchain network for inclusion in the blockchain, the third transaction comprising the second signature; and
transmit a fourth blockchain transaction to one or more nodes of the blockchain network for inclusion in the blockchain, the fourth blockchain transaction comprising the second value.

11. The computer equipment of claim 9, wherein the first signature is generated by applying the first one-way function to at least i) the first value, and ii) a result of applying a third one-way function to the first message.

12. The computer equipment of claim 9, wherein the first signature is a hash-based message authentication code.

13. The computer equipment of claim 9, wherein said transmitting of the second transaction comprises transmitting the second transaction to one or more nodes of the blockchain network after the first transaction is included in the blockchain.

14. The computer equipment of claim 9, wherein the registered value and the first value are part of a sequence of values, and wherein each next value in the sequence is generated by applying a fourth one-way function to a previous value in the sequence.

15. A non-transitory computer-readable storage medium comprising a computer program configured so as when run on one or more processors, the one or more processors perform a method of attesting to a first signature used by a first party to sign a first message, wherein a blockchain comprises a recorded transaction, and the recorded transaction comprises a registered value generated by applying a one-way function to a first value, the method being performed by the first party and comprising:

generating the first signature by applying a first one-way function to at least the first value and the first message;

transmitting a first transaction to one or more nodes of a blockchain network for inclusion in the blockchain, the first transaction comprising the first signature; and transmitting a second transaction to one or more nodes of the blockchain network for inclusion in the blockchain, the second transaction comprising the first value, wherein a second party is configured to verify the first signature was generated by the first party by:

generating a candidate first signature by applying the first one-way function to the at least the first value and the first message; and verifying that the candidate first signature matches the first signature.

16. The non-transitory computer-readable storage medium of claim 15, wherein the first value is an updated registered value and is generated by applying a one-way function to a second value, and wherein the computer program is configured so as when run on the one or more processors, the one or more processor is configured to:

generate a second signature by applying a second one-way function to at least the second value and a second message;

transmit a third transaction to one or more nodes of the blockchain network for inclusion in the blockchain, the third transaction comprising the second signature; and transmit a fourth blockchain transaction to one or more nodes of the blockchain network for inclusion in the blockchain, the fourth blockchain transaction comprising the second value.

17. The non-transitory computer-readable storage medium of claim 15, wherein the first signature is generated by applying the first one-way function to at least i) the first value, and ii) a result of applying a third one-way function to the first message.

18. The non-transitory computer-readable storage medium of claim 15, wherein the first signature is a hash-based message authentication code.

19. The non-transitory computer-readable storage medium of claim 15, wherein said transmitting of the second transaction comprises transmitting the second transaction to one or more nodes of the blockchain network after the first transaction is included in the blockchain.

20. The non-transitory computer-readable storage medium of claim 15, wherein the registered value and the first value are part of a sequence of values, and wherein each next value in the sequence is generated by applying a fourth one-way function to a previous value in the sequence.

* * * * *